United States Patent
Kim (10) Patent No.: US 9,613,357 B2
(45) Date of Patent: Apr. 4, 2017

(54) AUTHORIZING THE USE OF A BIOMETRIC CARD

(71) Applicant: Moon J. Kim, Palo Alto, CA (US)

(72) Inventor: Moon J. Kim, Palo Alto, CA (US)

(*) Notice: Subject to any disclaimer, the term of this patent is extended or adjusted under 35 U.S.C. 154(b) by 0 days.

(21) Appl. No.: 14/747,131

(22) Filed: Jun. 23, 2015

(65) Prior Publication Data

US 2016/0379218 A1    Dec. 29, 2016

Related U.S. Application Data

(63) Continuation of application No. 14/469,959, filed on Aug. 27, 2014, now Pat. No. 9,092,656, which is a continuation of application No. 13/853,349, filed on Mar. 29, 2013, now Pat. No. 8,820,647, which is a continuation of application No. 13/114,121, filed on May 24, 2011, now Pat. No. 8,408,471.

(51) Int. Cl.
| | |
|---|---|
| *G06K 5/00* | (2006.01) |
| *G06Q 20/40* | (2012.01) |
| *G06K 19/077* | (2006.01) |
| *G06Q 20/10* | (2012.01) |
| *G06K 9/00* | (2006.01) |
| *H01S 5/34* | (2006.01) |
| *H01S 5/183* | (2006.01) |
| *H01S 5/187* | (2006.01) |

(52) U.S. Cl.
CPC ..... *G06Q 20/40145* (2013.01); *G06K 9/0012* (2013.01); *G06K 9/00013* (2013.01); *G06K 19/07701* (2013.01); *G06Q 20/105* (2013.01); *G06Q 20/409* (2013.01); *H01S 5/183* (2013.01); *H01S 5/187* (2013.01); *H01S 5/34* (2013.01)

(58) Field of Classification Search
USPC .......................... 235/380, 382; 382/115, 124
See application file for complete search history.

(56) References Cited

U.S. PATENT DOCUMENTS

| | | | |
|---|---|---|---|
| 5,719,950 A * | 2/1998 | Osten | A61B 5/0205 340/5.82 |
| 6,898,299 B1 | 5/2005 | Brooks | |
| 7,796,013 B2 | 9/2010 | Murakami et al. | |
| 8,092,345 B2 | 1/2012 | Ellis et al. | |
| 8,408,471 B2 | 4/2013 | Kim | |
| 8,820,647 B2 | 9/2014 | Kim | |

(Continued)

OTHER PUBLICATIONS

Daniel St Cyr, USPTO Office Action, U.S. Appl. No. 13/114,121, Mail Date Aug. 2, 2012, 6 pages.

(Continued)

*Primary Examiner* — Jamara Franklin
(74) *Attorney, Agent, or Firm* — Madeline F. Schiesser; Keohane & D'Alessandro PLLC (57) ABSTRACT

Embodiments of the present invention provide a system and method for authorizing the use of a biometric transaction card. Specifically, embodiments of the present invention provide a biometric card having a biometric sensor to determine whether the biometric information (fingerprint) is from human skin. In a typical embodiment, the cardholder approaches a magnetic reader with the card. The user places his/her finger on the $SpO_2$ sensor of the card. The sensor estimates the $SpO_2$ level. Card authorization is based, in part, on the estimated $SpO_2$ level.

20 Claims, 9 Drawing Sheets

(56) References Cited

U.S. PATENT DOCUMENTS

2004/0179723 A1* 9/2004 Sano ................ G06K 9/00033
382/124

OTHER PUBLICATIONS

Daniel St Cyr, USPTO Final Office Action, U.S. Appl. No. 13/114,121, Mail Date Dec. 19, 2012, 6 pages.
Daniel St Cyr, USPTO Notice of Allowance and Fee(s) Due, U.S. Appl. No. 13/114,121, Date Mailed Feb. 11, 2013, 11pages.
Daniel St Cyr, USPTO Office Action, U.S. Appl. No. 13/853,349, Notification Date Sep. 13, 2013, 15 pages.
Daniel St Cyr, USPTO Final Office Action, U.S. Appl. No. 13/853,349, Notification Date Feb. 11, 2014, 11 pages.
Daniel St Cyr, USPTO Notice of Allowance and Fee(s) Due, U.S. Appl. No. 13/853,349, Date Mailed Apr. 29, 2014, 14 pages.
Daniel St Cyr, USPTO Office Action, U.S. Appl. No. 14/469,959, Notification Date Nov. 26, 2014, 13 pages.
Daniel St Cyr, USPTO Notice of Allowance and Fee(s) Due, U.S. Appl. No. 14/469,959, Date Mailed Mar. 17, 2015, 7 pages.

* cited by examiner

AUTHORIZING THE USE OF A BIOMETRIC CARD

CROSS-REFERENCE TO RELATED APPLICATION

This application is a continuation of commonly-owned and co-pending U.S. application Ser. No. 14/469,959, filed Aug. 27, 2014. That earlier filed application is itself a continuation application of commonly-owned U.S. application Ser. No. 13/853,349, filed on Mar. 29, 2013 (now U.S. Pat. No. 8,820,647, issued Sep. 2, 2014). That earlier filed application is itself a continuation application of commonly-owned U.S. application Ser. No. 13/114,121, filed on May 24, 2011 (now U.S. Pat. No. 8,408,471, issued Apr. 2, 2013).

FIELD OF THE INVENTION

In general, the present invention relates to biometric cards. Specifically, the present invention relates to a system and method for authorizing the use of a biometric transaction card.

BACKGROUND OF THE INVENTION

As global fraud concerns relating to credit cards continue to grow, many card issuers are attempting to come up with more secure credit cards for their cardholders. Existing methods for combating fraud still, at times, leave merchants and banks vulnerable. One attempt at producing a more secure card is the biometric card. A biometric card is similar to existing cards but will also contain information about the cardholder's body, such as a fingerprint. However, reports have surfaced that some fingerprint readers can be fooled using non-human contact, such as a gel mold.

SUMMARY OF THE INVENTION

In general, the embodiments of the present invention provide a system and method for authorizing the use of a biometric transaction card. Specifically, embodiments of the present invention provide a biometric card having a biometric sensor to determine whether the biometric information (fingerprint) is from human skin. In a typical embodiment, the cardholder approaches a magnetic reader with the card. The card is powered up when the user attempts to use the card. The user places his/her finger on the $SpO_2$ sensor of the card. The sensor includes a red laser, an infrared (IR) laser, and a photodetector. The red laser and photodetector are turned on. Analog-to-digital conversion on the reflective light scattering received by the photodetector is performed. The red laser is turned off and the infrared (IR) laser is turned on. Analog-to-digital conversion on the reflective light scattering received by the photodetector is performed. The IR laser and the photodetector are turned off. The $SpO_2$ level of the card user is estimated based on the ratio of reflective scattering from the red and IR red lasers. Card authorization is based, in part, on the $SpO_2$ level.

The present invention relates to biometric transaction or authorization cards including, but not limited to, credit cards, debit cards, gift cards, and identification cards. Any type of card within the scope of the present invention may be used.

A first aspect of the present invention provides a biometric card having a biometric sensor used for authorizing the use of the card, comprising: a biometric fingerprint imager, comprising: a fingerprint sensor configured to sense a fingerprint of the card user; an authenticator configured to authenticate the sensed fingerprint information; a biometric sensor, comprising: a red laser configured to emit a first laser light; an infrared (IR) laser configured to emit a second laser light; at least one photodetector configured to generate a first photocurrent signal based on the reflective scattering of the first laser light and generate a second photocurrent signal based on the reflective scattering of the second laser light; an analog-to-digital converter configured to convert the first photocurrent signal to a first waveform and convert the second photocurrent signal to a second waveform; a processing component configured to estimate a $SpO_2$ level based on the ratio of the first and second waveforms; and an authorizing component configured to authorize use of the card based on the fingerprint authentication and the $SpO_2$ level estimate.

A second aspect of the present invention provides a method for providing a biometric card having a biometric sensor used for authorizing the use of the card, comprising: providing a biometric fingerprint imager, comprising: a fingerprint sensor configured to sense a fingerprint of the card user; an authenticator configured to authenticate the sensed fingerprint information; providing a biometric sensor, comprising: a red laser configured to emit a first laser light; an infrared (IR) laser configured to emit a second laser light; at least one photodetector configured to generate a first photocurrent signal based on the reflective scattering of the first laser light and generate a second photocurrent signal based on the reflective scattering of the second laser light; an analog-to-digital converter configured to convert the first photocurrent signal to a first waveform and convert the second photocurrent signal to a second waveform; a processing component configured to estimate a $SpO_2$ level based on the ratio of the first and second waveforms; and an authorizing component configured to authorize use of the card based on the fingerprint authentication and the $SpO_2$ level estimate.

A third aspect of the present invention method for authorizing the use of a biometric card, comprising: sensing a fingerprint of the card user; authenticating the sensed fingerprint information; estimating the SpO2 level of the card user; and authorizing the use of the card based on the fingerprint authentication and the $SpO_2$ level estimate.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The phrase "card technologies" encompasses any technology which can be placed on a card. Typically, we think of a plastic bank card or credit card, though there are many other materials and uses of cards. However, the card is usually for providing "access" to something, such as a bank account, credit card account, secure area, etc.

Most identity and transaction cards used today contain some basic details such as name, a photograph of the person's face and a reference number that allows the card to be matched against a central record held by the card issuer. Other cards may also contain magnetic strips or barcodes that can be used with other machines or to unlock doors so that the card acts like a key. A biometric identity card is similar to existing cards but will also contain biometric information. Biometric information is information about a specific person's body, such as a fingerprint.

The authenticity of the fingerprint needs to be checked to determine whether the biometric information is coming from real human skin. $SpO_2$ (arterial blood oxygen saturation level) is one of the important vital signs of a human. The normal $SpO_2$ level is more than 96%. A level under 90% means that the person is in a fatal condition. $SpO_2$ is able to be measured easily by using a pulse oximetry method.

As indicated above, the embodiments of the present invention provide a system and method for authorizing the use of a biometric transaction card. Specifically, embodiments of the present invention provide a biometric card having a biometric sensor to determine whether the biometric information (fingerprint) is from human skin. In a typical embodiment, the cardholder approaches a magnetic reader with the card. The card is powered up when the user attempts to use the card. The user places his/her finger on the $SpO_2$ sensor of the card. The sensor includes a red laser, an infrared (IR) laser, and a photodetector. The red laser and photodetector are turned on. Analog-to-digital conversion on the reflective light scattering received by the photodetector is performed. The red laser is turned off and the infrared (IR) laser is turned on. Analog-to-digital conversion on the reflective light scattering received by the photodetector is performed. The IR laser and the photodetector are turned off. The $SpO_2$ level of the card user is estimated based on the ratio of reflective scattering from the red and IR red lasers. Card authorization is based, in part, on the $SpO_2$ level.

Figure 1:
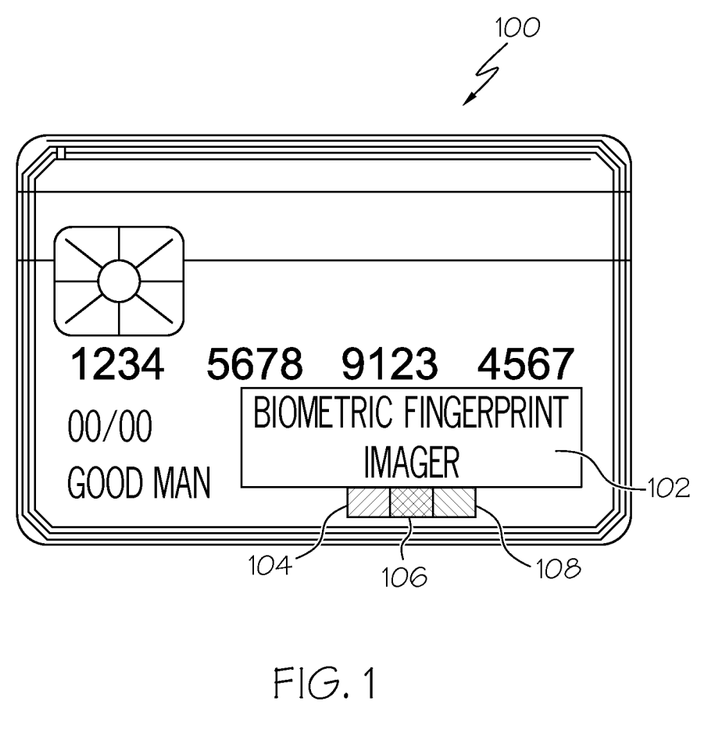
FIG. 1 depicts a biometric card according to an embodiment of the present invention.

Referring now to FIG. 1, a biometric card according to an embodiment of the present invention is depicted. Biometric card 100 includes biometric fingerprint imager 102, red laser 104, photodetector 106, and infrared (IR) laser 108. To authorize the use of a biometric transaction card, user biometric information is sampled with a separate fingerprint imager. A fingerprint sensor senses a fingerprint of the card user. A fingerprint authenticator authenticates the sensed fingerprint information. $SpO_2$ level is measured and used to determine the validity of the sampled biometric (fingerprint) information.

Figure 2A:
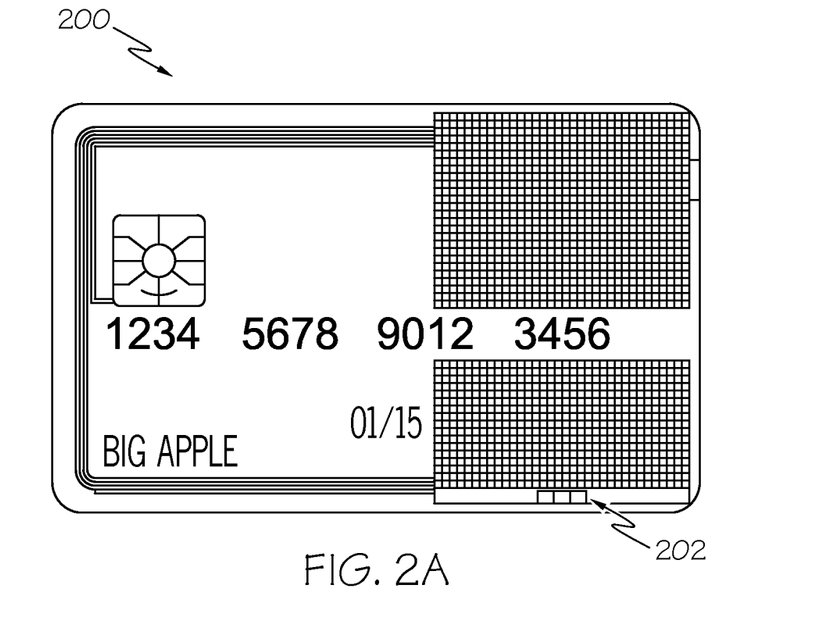
FIG. 2A depicts the front of a biometric card having a multi-sided sensor according to an embodiment of the present invention.
Figure 2B:
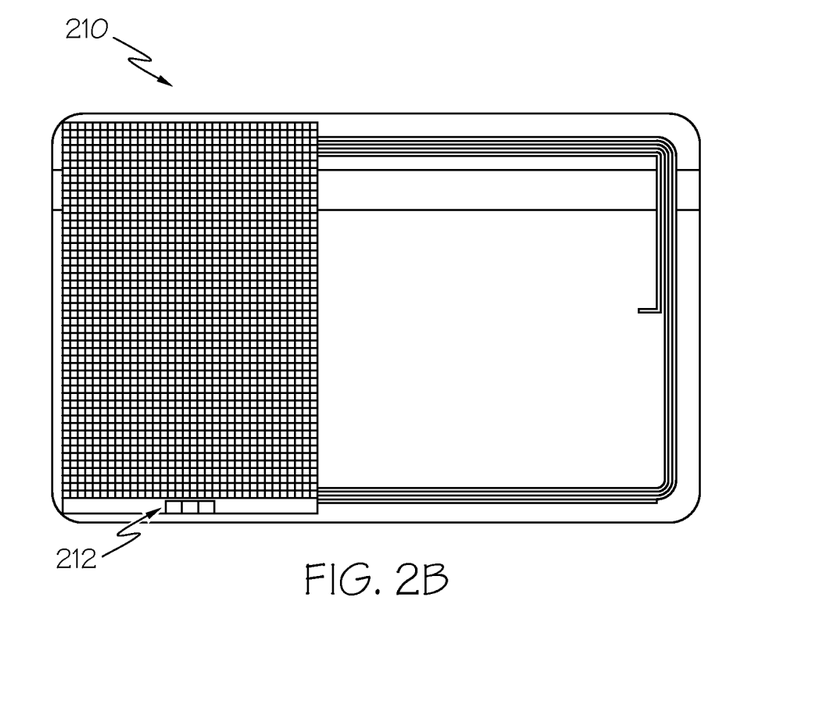
FIG. 2B depicts the back of a biometric card having a multi-sided sensor according to an embodiment of the present invention.

FIG. 2 depicts the front and back of a biometric card having a multi-sided sensor according to an embodiment of the present invention. The biometric card has a multi-sided sensor configuration. Card front 200 includes front side 202 of sensor. Card back 210 includes back side 212 of sensor.

Figure 3:
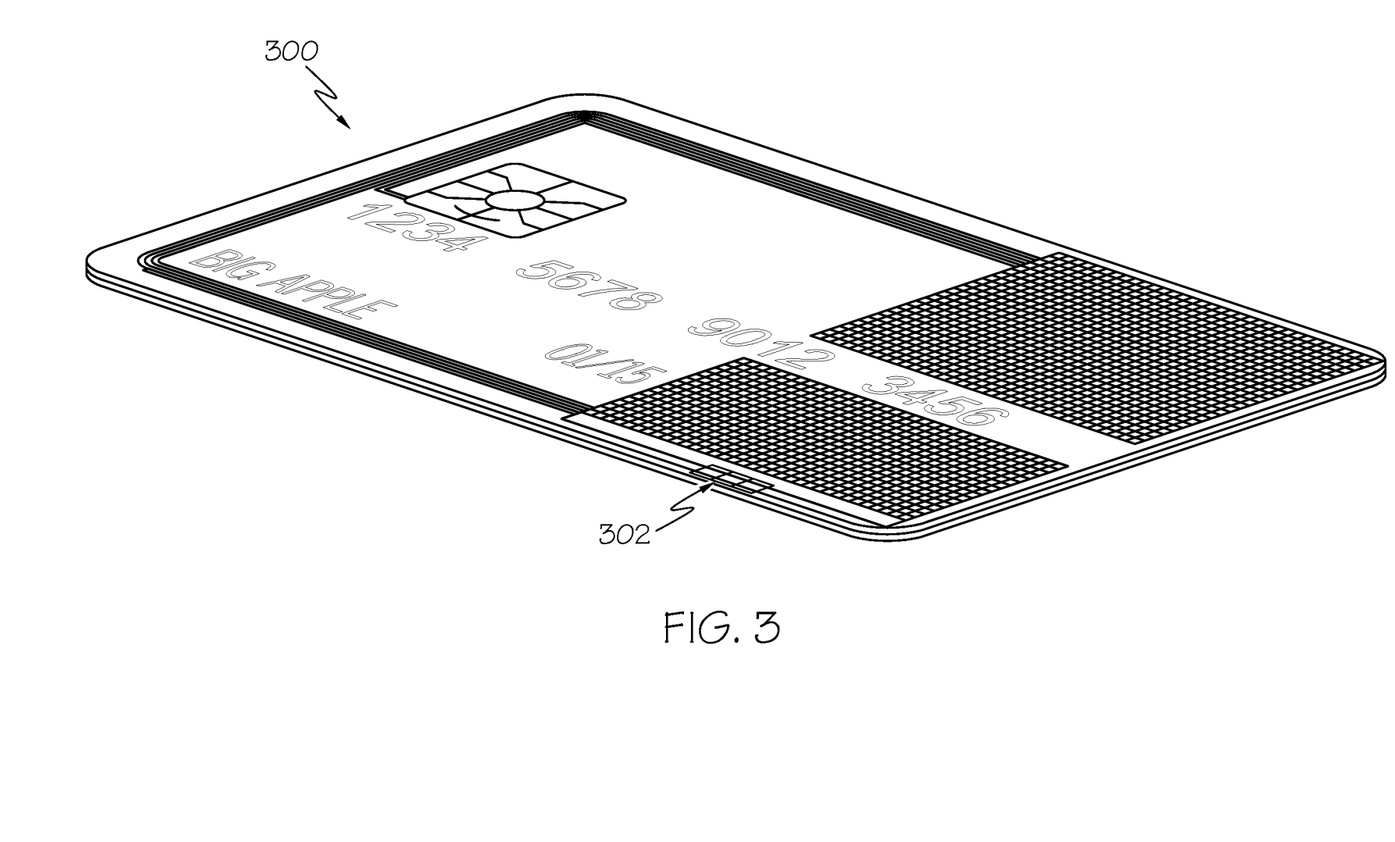
FIG. 3 depicts a biometric card having a transparent sensor according to an embodiment of the present invention.

FIG. 3 depicts a biometric card having a transparent sensor according to an embodiment of the present invention. Biometric card 300 includes transparent $SpO_2$ sensor placement. Sensor 302 contains only one set of infrared (IR) and red lasers. Sensor 302 contains, at most, two photodectors. Separate front and back photodectors may be required.

Figure 4A:
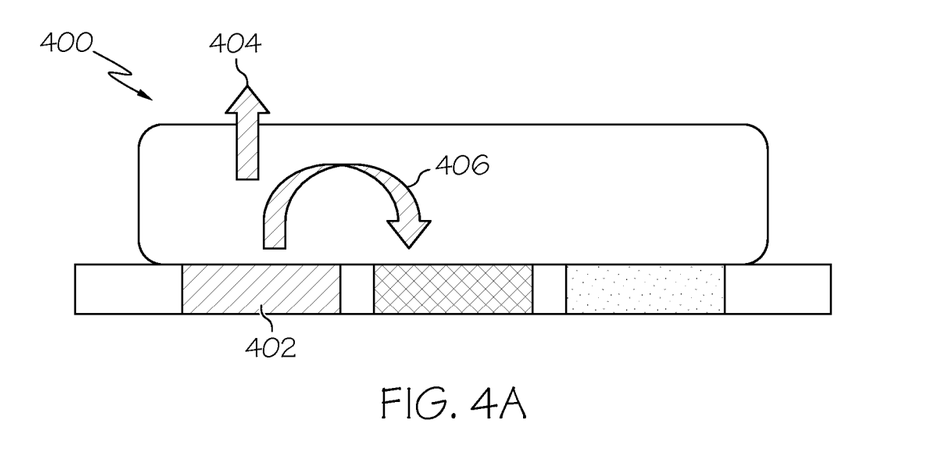
FIGS. 4A, 4B, and 4C depict $SpO_2$ level detection according to an embodiment of the present invention.
Figure 4B:
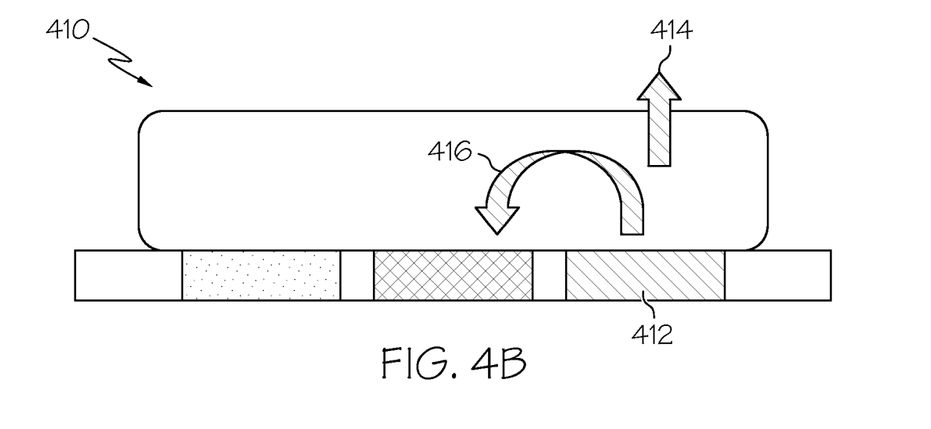

FIG. 4. depicts $SpO_2$ level detection according to an embodiment of the present invention. Sensor 400 highlights red laser 402 activity. Transmission 404 shows the emission of light from red laser 402. Reflection 406 shows the reflective scattering of light from red laser 402. Sensor 410 highlights infrared (IR) laser 412 activity. Transmission 414 shows the emission of light from IR laser 412. Reflection 416 shows the reflective scattering of light from IR laser 412.

Hemoglobin is a protein in red blood cells that carries oxygen. Hemoglobin can be saturated with oxygen molecules (oxyhemoglobin), or desaturated with oxygen molecules (deoxyhemoglobin). An infrared ray is absorbed in deoxyhemoglobin and a red ray is absorbed in oxyhemoglobin. A pulse signal is obtained as the reflection of applied light to the skin. A red ray and infrared ray are used to obtain two kinds of pulses. $SpO_2$ is calculated using the amplitude of these two pulses. The $SpO_2$ level is measured by placing the skin of a finger to the sensor.

Figure 4C:
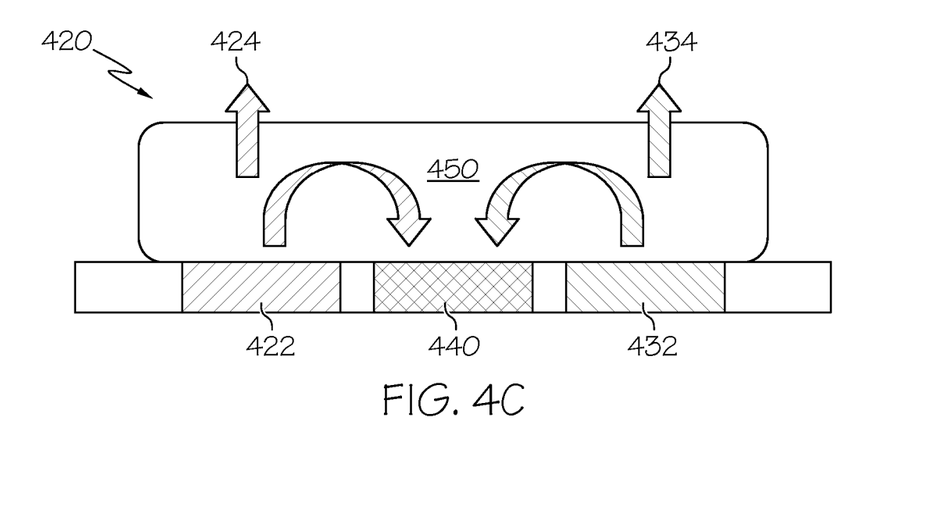

Sensor 420 depicts full $SpO_2$ level detection using red laser 422, IR laser 432, and photodetector 440. User finger 460 is placed on the sensor. Red laser 422 and IR laser 432 are alternatively turned on. Transmission 424 shows the emission of light from red laser 422. Transmission 434 shows the emission of light from IR laser 432. Reflection 450 shows the reflective scattering of light from red laser 422 and IR laser 432.

To estimate the $SpO_2$ level of the card user, red laser 422 and infrared (IR) laser 432 alternatively emit light. Blood volume increases and then decreases as the heart pumps blood through the user's finger. Blood cells within the blood absorb and reflect varying amounts of the red and infrared light depending the on the blood volume and how much oxygen binds to the cells' hemoglobin. Photodetector 440 detects a portion of the reflective scattering of light and, in response, sends a photocurrent to an analog-to-digital converter. The analog-to-digital converter digitizes the photocurrent to generate an optical waveform for each wavelength. A processing component analyzes waveforms generated at both red and infrared wavelengths, and uses ratio of the relative absorption to estimate the $SpO_2$ level of the card user.

Figure 5:
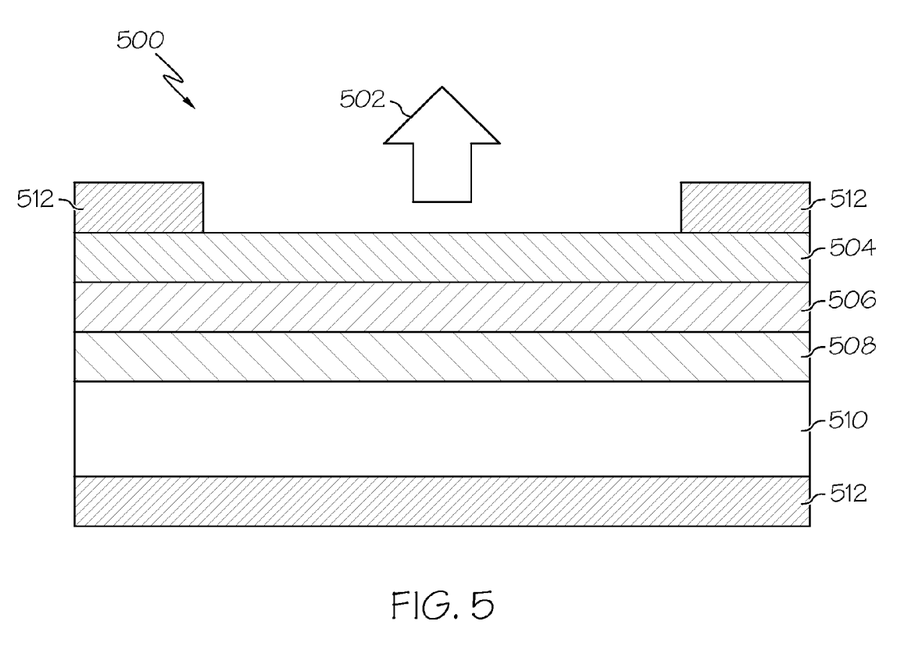
FIG. 5 depicts a vertical-cavity surface-emitting laser according to an embodiment of the present invention.

FIG. 5 depicts a vertical-cavity surface-emitting laser according to an embodiment of the present invention. A vertical-cavity surface-emitting laser is a type of semiconductor laser diode with laser beam emission 502 perpendicular to the top surface. Laser 500 composition is made up of several layers in order to have the capacity to emit light. Laser 500 is incased in metal 512. N-Substrate 510 is the underlying layer. The laser resonator consists of two distributed Bragg reflector (DBR) mirrors parallel to the wafer surface with an active region consisting of one or more quantum wells for the laser light generation in between. In this embodiment, P- and n-type Bragg reflectors (504 and 508, respectively) surround quantum well 506.

Figure 6A:
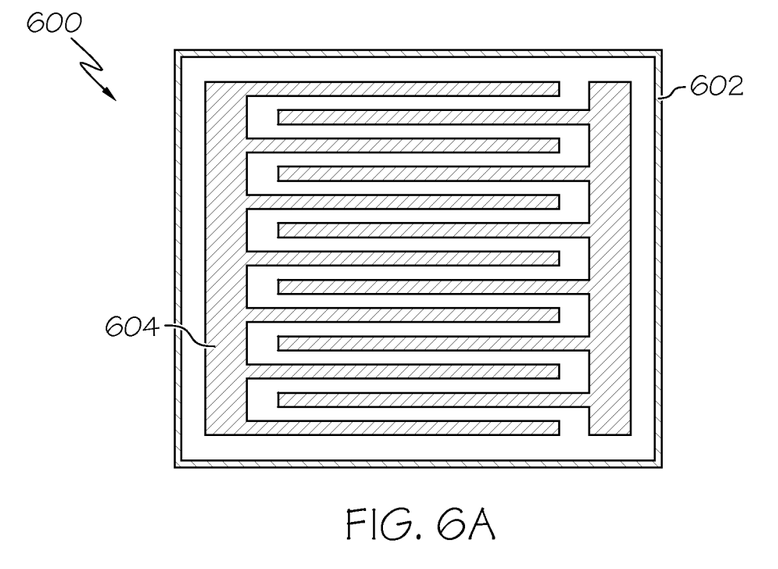
FIGS. 6A and 6B depict a photodetector according to an embodiment of the present invention.
Figure 6B:
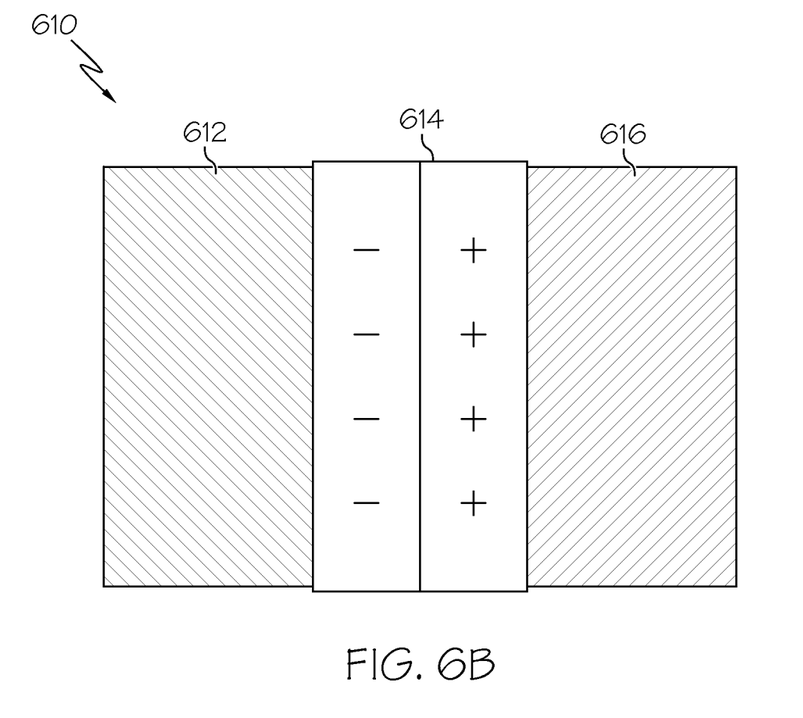

FIG. 6 depicts a photodetector according to an embodiment of the present invention. A photodetector is an optical detector that converts light signals to electrical signals, which can be amplified and processed. Semiconductor photodectors are the most commonly used detectors because they provide good performance and are small in size and cost. As shown, semiconductor 600 is made up of semiconductor region 602 and metal 604. The most common semiconductor photodetector is the PIN photodector. PIN photodetector 610 has an intrinsic (very lightly doped) semiconductor region 614 sandwiched between a p-type region 612 and an n-type region 616.

Figure 7A:
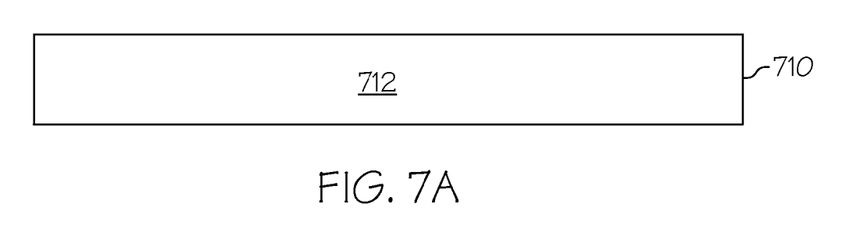
FIGS. 7A, 7B, and 7C depict laser and photodetector integration according to an embodiment of the present invention.
Figure 7B:
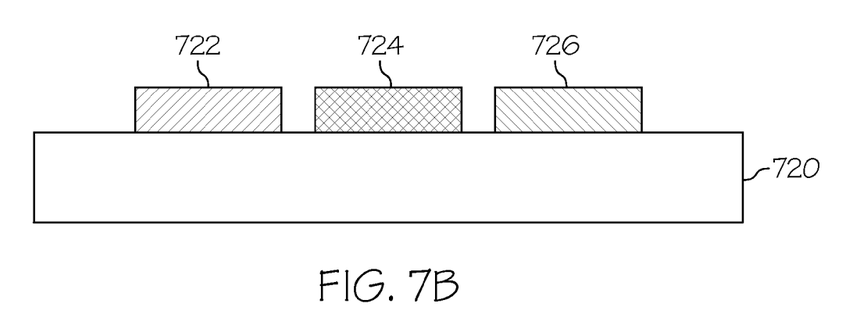
Figure 7C:
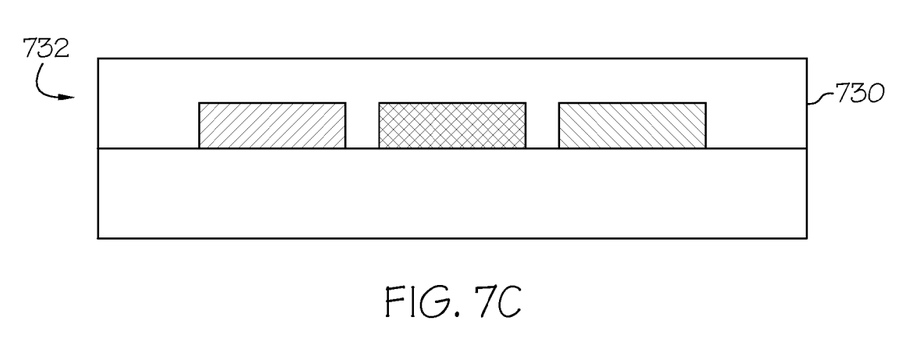

FIG. 7 depicts laser and photodetector integration according to an embodiment of the present invention. Sensor 710 shows only film layer 712. Sensor 720 further depicts red laser 722, photodetector 724, and IR laser 726. Sensor 730 further depicts coating 732.

Figure 8:
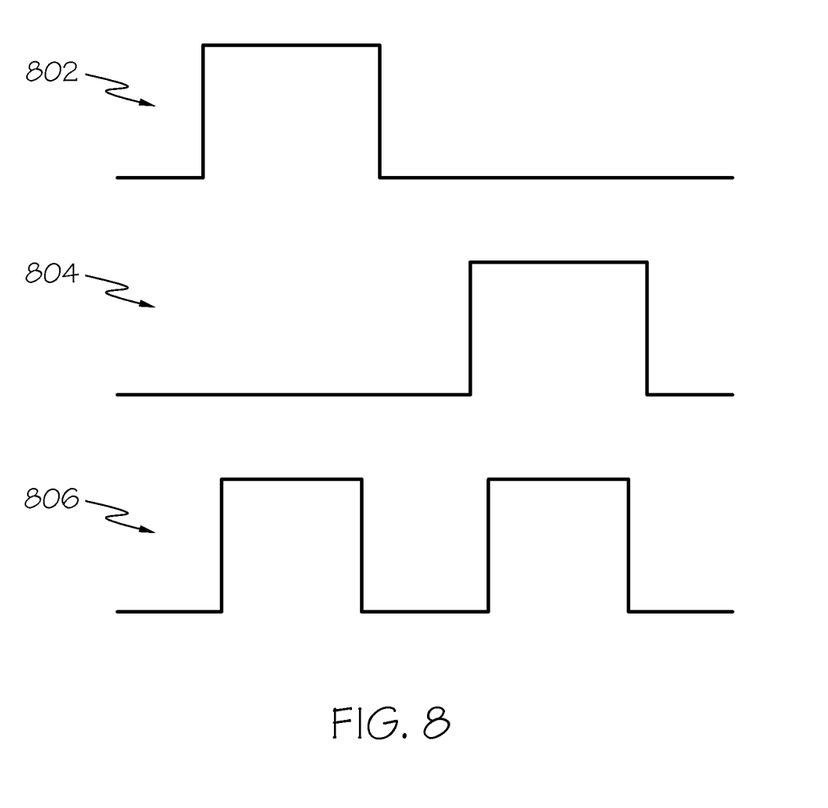
FIG. 8 depicts an operation timing diagram according to an embodiment of the present invention.

FIG. 8 depicts an operation timing diagram according to an embodiment of the present invention. The reflection of each laser emission must be measured. Red laser emission 802 is shown followed by IR laser emission 804. Analog-to-digital conversion 806 converts each of the light signals to a waveform. The ratio between red and IR reflections is used to estimate an $SpO_2$ reading.

Figure 9:
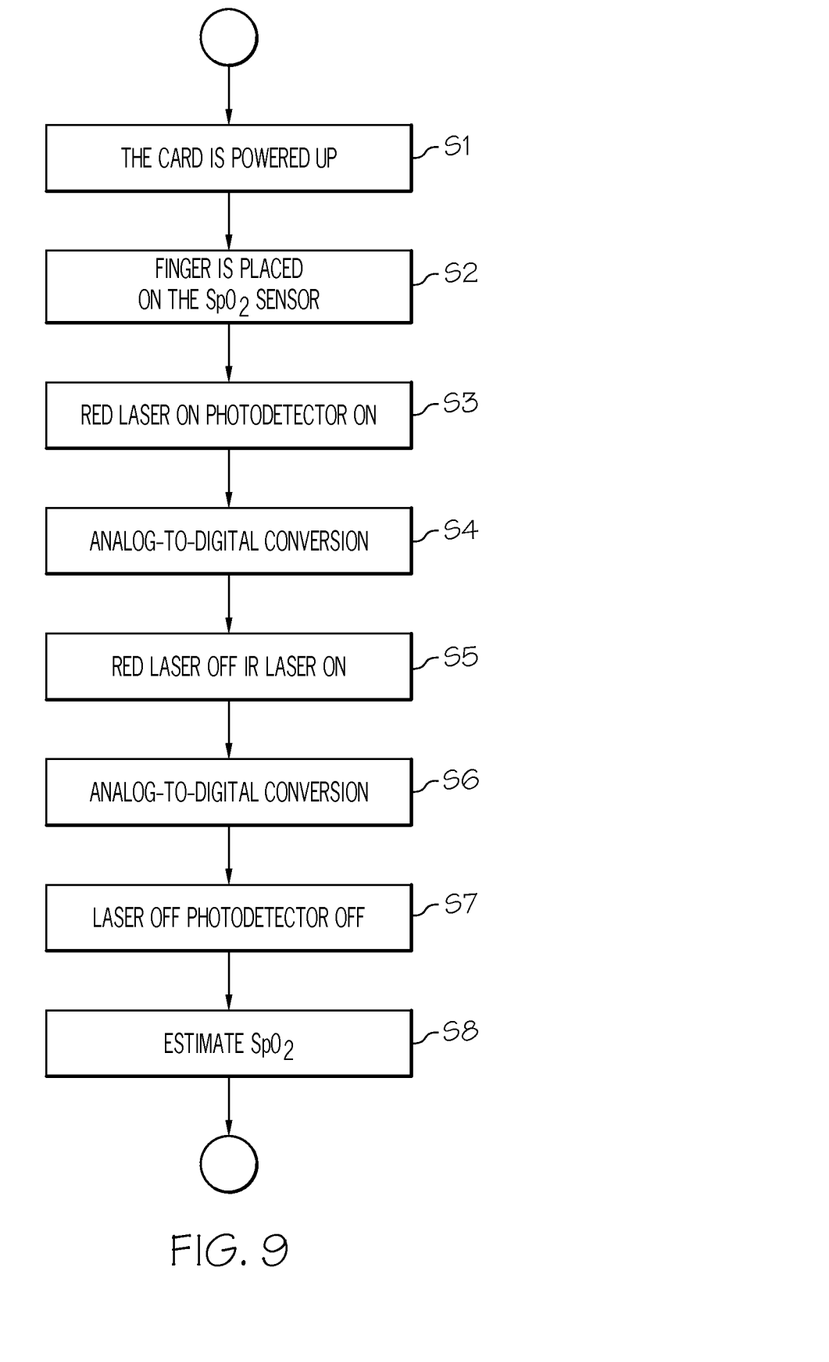
FIG. 9 depicts a flow diagram according to an embodiment of the present invention.

FIG. 9 depicts a flow diagram according to an embodiment of the present invention. The card is powered up when the user is attempting to use the card (step S1). The user places his/her finger on the $SpO_2$ sensor of the card (step S2). The red laser and photodetector are turned on (step S3). Analog-to-digital conversion on the reflective light scattering received by the photodetector is performed (step S4). The red laser is turned off and the infrared (IR) laser is turned on (step S5). Analog-to-digital conversion on the reflective light scattering received by the photodetector (step S6) is performed. The IR laser and the photodetector are turned off (step S7). The $SpO_2$ level of the card user is estimated (step S8). The estimated $SpO_2$ level is used as a factor in card authorization.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

The invention claimed is:

1. A method for authorizing the use of a biometric card, comprising:
 sensing a biometric identification reading associated with skin;
 generating a first photocurrent signal based on reflective scattering of a first laser light generated by a first laser,
 generating a second photocurrent signal based on reflective scattering of a second laser light emitted by a second laser,
 converting the first photocurrent signal to a first waveform and converting the second photocurrent signal to a second waveform, wherein one of the first and second lasers is an infrared (IR) laser;
 determining a relative absorption of the first and second waveforms; and
 authorizing use of the card in response to an authentication of the sensed biometric identification reading and the relative absorption.

2. The method of claim 1, wherein a sensor is used to determining the relative absorption of the first and second waveforms.

3. The method of claim 2, wherein the sensor includes the first laser, the second laser, and a photodetector.

4. The method of claim 3, wherein at least one of the first and second lasers is a vertical-cavity surface-emitting laser.

5. The method of claim 3, wherein the at least one of the first and second lasers comprises n-Substrate, n-type Bragg reflector, p-type Bragg reflector, and quantum well layers.

6. The method of claim 3, wherein the photodetector structure comprises an intrinsic semiconductor region, a p-type region, and an n-type region.

7. The method of claim 2, wherein the sensor comprises a multi-sided configuration.

8. The method of claim 2, wherein the sensor comprises a transparent configuration.

9. The method of claim 1, wherein the biometric identification reading associated with skin is a fingerprint of the card user sensed by a fingerprint sensor, and an authenticator authenticates the sensed fingerprint information.

10. The method of claim 1, further comprising:
 converting, by an analog-to-digital converter, the first photocurrent signal to a first waveform; and
 converting, by the analog-to-digital converter, the second photocurrent signal to a second waveform;
 wherein an $SpO_2$ level is estimated based on a ratio of the first and second waveforms.

11. A method for providing a biometric card having a biometric sensor used for authorizing the use of the card, comprising:
 providing a biometric imager, comprising:
  a biometric skin sensor configured to sense a biometric reading associated with skin;
 providing a biometric sensor, comprising:
  a first laser configured to emit a first laser light;

a second laser configured to emit a second laser light, wherein one of the first and second lasers is an infrared (IR) laser;

at least one photodetector configured to generate a first photocurrent signal based on the reflective scattering of the first laser light and generate a second photocurrent signal based on the reflective scattering of the second laser light;

an analog-to-digital converter configured to convert the first photocurrent signal to a first waveform and convert the second photocurrent signal to a second waveform; and a processing component configured to estimate a $SpO_2$ level based on the ratio of the first and second waveforms; and providing an authorizing component configured to authorize use of the card in response to an authentication of the sensed biometric reading and the estimated $SpO_2$ level.

12. The method of claim 11, wherein at least one of the first and second lasers is a vertical-cavity surface-emitting laser.

13. The method of claim 11, wherein the biometric sensor comprises a multi-sided configuration.

14. The method of claim 13, wherein the sensor comprises a transparent configuration.

15. The method of claim 11, wherein the at least one of the first and second lasers comprises n-Substrate, n-type Bragg reflector, p-type Bragg reflector, and quantum well layers.

16. The method of claim 11, wherein the photodetector structure comprises an intrinsic semiconductor region, a p-type region, and an n-type region.

17. A biometric card having a biometric sensor used for authorizing the use of the card, comprising:

a biometric imager, comprising:

a biometric skin sensor configured to sense a biometric reading associated with skin;

a biometric sensor, comprising:

a first laser configured to emit a first laser light;

a second laser configured to emit a second laser light, wherein one of the first and second lasers is an infrared (IR) laser;

at least one photodetector configured to generate a first photocurrent signal based on the reflective scattering of the first laser light and generate a second photocurrent signal based on the reflective scattering of the second laser light;

an analog-to-digital converter configured to convert the first photocurrent signal to a first waveform and convert the second photocurrent signal to a second waveform; and a processing component configured to determining a relative absorption of the first and second waveforms; and an authorizing component configured to authorize use of the card in response to an authentication of the sensed biometric reading and the relative absorption.

18. The method of claim 17, wherein at least one of the first and second lasers is a vertical-cavity surface-emitting laser and at least one of the first and second lasers comprises n-Substrate, n-type Bragg reflector, p-type Bragg reflector, and quantum well layers, and wherein the photodetector structure comprises an intrinsic semiconductor region, a p-type region, and an n-type region.

19. The method of claim 17, wherein the biometric sensor comprises a multi-sided configuration.

20. The method of claim 19, wherein the sensor comprises a transparent configuration.

* * * * *